United States Patent
Toyoshima

(10) Patent No.: US 7,020,118 B2
(45) Date of Patent: Mar. 28, 2006

(54) SYSTEM AND METHOD FOR ACTIVATION OF A WIRELESS MODULE

(75) Inventor: Akihiko Toyoshima, Tokyo (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 958 days.

(21) Appl. No.: 09/972,761

(22) Filed: Oct. 5, 2001

(65) Prior Publication Data

US 2002/0085530 A1 Jul. 4, 2002

Related U.S. Application Data

(60) Provisional application No. 60/240,011, filed on Oct. 13, 2000.

(51) Int. Cl.
*H04Q 11/00* (2006.01)

(52) U.S. Cl. .................. 370/338; 455/435

(58) Field of Classification Search .......... 370/310, 370/310.1, 310.2, 328, 338, 349; 455/555–557, 455/435
See application file for complete search history.

(56) References Cited

U.S. PATENT DOCUMENTS

| | | | |
|---|---|---|---|
| 5,294,792 A | 3/1994 | Lewis et al. ............ 250/221 |
| 5,603,084 A * | 2/1997 | Henry et al. ............ 455/419 |
| 5,781,723 A | 7/1998 | Yee et al. ............... 713/200 |
| 5,790,800 A | 8/1998 | Gauvin et al. ........... 709/227 |
| 5,884,195 A | 3/1999 | Gomez et al. ........... 455/572 |
| 5,893,037 A | 4/1999 | Reele et al. ............ 455/556.1 |
| 5,964,830 A | 10/1999 | Durrett ................. 709/200 |
| 6,061,346 A * | 5/2000 | Nordman ................ 370/352 |
| 6,078,908 A | 6/2000 | Schmitz ................. 705/50 |
| 6,304,753 B1 * | 10/2001 | Hartmaier ............... 455/413 |
| 6,374,079 B1 * | 4/2002 | Hsu .................... 455/11.1 |
| 6,421,325 B1 | 7/2002 | Kikinis ................. 370/280 |
| 6,469,998 B1 * | 10/2002 | Burgaleta Salinas et al. ................ 370/338 |
| 6,532,370 B1 | 3/2003 | Underbrink et al. ...... 455/552.1 |
| 6,549,773 B1 * | 4/2003 | Linden et al. .......... 455/426.1 |
| 6,684,084 B1 | 1/2004 | Phillips ................ 455/558 |
| 6,694,430 B1 | 2/2004 | Zegelin et al. .......... 713/160 |
| 6,728,531 B1 | 4/2004 | Lee et al. .............. 455/419 |
| 6,788,332 B1 | 9/2004 | Cook ................... 348/14.02 |
| 6,804,730 B1 | 10/2004 | Kawashima ............. 710/36 |
| 6,871,063 B1 | 3/2005 | Schiffer ................ 455/410 |
| 2002/0056142 A1 | 5/2002 | Redmond ............... 725/151 |

\* cited by examiner

*Primary Examiner*—Dang Ton
*Assistant Examiner*—Phuc Tran
(74) *Attorney, Agent, or Firm*—John L. Rogitz

(57) ABSTRACT

A wireless module system and method for activation is provided which includes, in one embodiment a wireless module including a complete electronic serial number and a preliminary internet protocol address. A wireless module account is established with an activation center through a user activation web site. A permanent internet protocol address is created in establishing the wireless module account. The wireless module may be connected to any appropriate peripheral device and may allow for wireless communication of the peripheral devices with any other devices, people, and databases via wireless communication including through an internet or an intranet. In one embodiment, a wireless module activation server includes the user activation web site which is in electronic data communication with at least one wireless module account. The wireless module is removably connected to the peripheral device and provides the peripheral device with portability and accessability.

11 Claims, 5 Drawing Sheets

SYSTEM AND METHOD FOR ACTIVATION OF A WIRELESS MODULE

This application is related to and incorporated herein by reference U.S. patent application Ser. No. 09/976,455, of Akhiko Toyoshima, for HOME NETWORK USING WIRELESS MODULE, filed Oct. 11, 2001; U.S. patent application Ser. No. 09/972,760, of Akhiko Toyoshima, for MULTIPLE WIRELESS FORMAT PHONE SYSTEM AND METHOD, filed concurrent herewith; U.S. patent application Ser. No. 09/974,724, of Akhiko Toyoshima, for WIRELESS MODEM MODULE SERVER SYSTEM, filed Oct. 9, 2001; U.S. patent application Ser. No. 09/972,183, of Akhiko Toyoshima, for WIRELESS MODULE SECURITY SYSTEM AND METHOD, filed concurrent herewith, U.S. patent application Ser. No. 09/977,080, of Akihiko Toyoshima, for A DEFAULT PORTAL SITE ACCESS WITH WIRELESS MODULE, filed Oct. 12, 2001; and U.S. patent application Ser. No. 09/972,781, of Akihiko Toyoshima, for SYSTEM, METHOD AND APPARATUS FOR EBEDDED FIRMWARE CODE UPDATE, filed concurrent herewith; and U.S. patent application Ser. No. 09/928,582, of Baranowski, et al.; for WIRELESS MODULE, filed Aug. 13, 2001; and Provisional Patent Application Ser. No. 60/240,011; of Jaun et al, for PORTABLE WIRELESS MODEM, filed Oct. 13, 2000, the benefit whose priority date is claimed.

COPYRIGHT NOTICE

A portion of the disclosure of this patent document contains material which is subject to copyright protection. The copyright owner has no objection to the ficsimile reproduction of the patent document or the patent discloser, as it appears in the Patent and Trademark Office patent file or records, but otherwise reserves all copyright rights whatsoever.

FIELD OF THE INVENTION

This invention relates generally to the field of removable wireless modules. More particularly, this invention relates to a system and method for activation of a data storage and wireless transmission module.

BACKGROUND OF THE INVENTION

The need for portability of data has increased over the years, and has spurred the development of removable memory devices. For example, Memory Stick™ is a removable data storage device made by Sony Corporation and is a recordable integrated circuit (IC) digital storage device having a storage capacity greater than a standard 3.5 inch floppy disk. Most importantly, Memory Stick™ is smaller than a stick of gum, very lightweight, and therefore ultra-portable. However, the need for accessability to people, information, and data has also increased despite the currently increased portability.

Due to cost and related space limitations, peripheral devices must impose a limit on the number of ports or sockets utilized for removable memory devices and other separate hardware. Currently, these peripheral devices utilize separate ports or sockets for communication and storage devices. For example, a laptop computer utilizes one socket for a storage device and another socket for communication. As the need for accessability to people, information, and data increases it would be desirable to provide accessability and portability to peripheral devices without increasing their cost or exceeding the related space limitations of the peripheral devices.

SUMMARY OF THE INVENTION

In view of the foregoing, a wireless module is provided for wireless portability and wireless accessability to people, information, and data.

In particular, a wireless module, in one embodiment, is the similar size, shape, and form factor as the current Memory Stick™. Also, the wireless module allows for wireless communication with digital storage functionality. In one embodiment, a method of activation of the wireless module includes providing the wireless module with initialization data, establishing a wireless module account with an activation center, transmitting operational data to the wireless module from the activation center, and storing the operational data. In a further embodiment, the wireless module may be provided to any number of peripheral devices compatible with the Memory Stick™ removable extended input/output (I/O) slot. Memory Stick™ extended I/O format meets these requirements and the wireless module will be able to be supported as one of the application devices.

These and other features and advantages of the invention will be understood upon the consideration of the following detailed description of the invention and accompanying drawings. The features of the invention believed to be novel are set forth with particularity in the appended claims. The invention itself however, both as to organization and method of operation, together with further objects and advantages thereof, may be best understood by reference to the following description taken in conjunction with the accompanying drawing.

BRIEF DESCRIPTION OF THE DRAWING

The following detailed description, given by way of example, and not intended to limit the present invention solely thereto, will best be understood in conjunction with the accompanying drawings in which.

DETAILED DESCRIPTION OF THE INVENTION

While the present invention has been particularly shown and described with reference to an embodiment(s), it will be understood that various changes and modifications may be made without departing from the spirit and scope of this invention. It is intended that the appended claims be interpreted to cover the embodiments described herein and all equivalents thereto.

Figure 1:
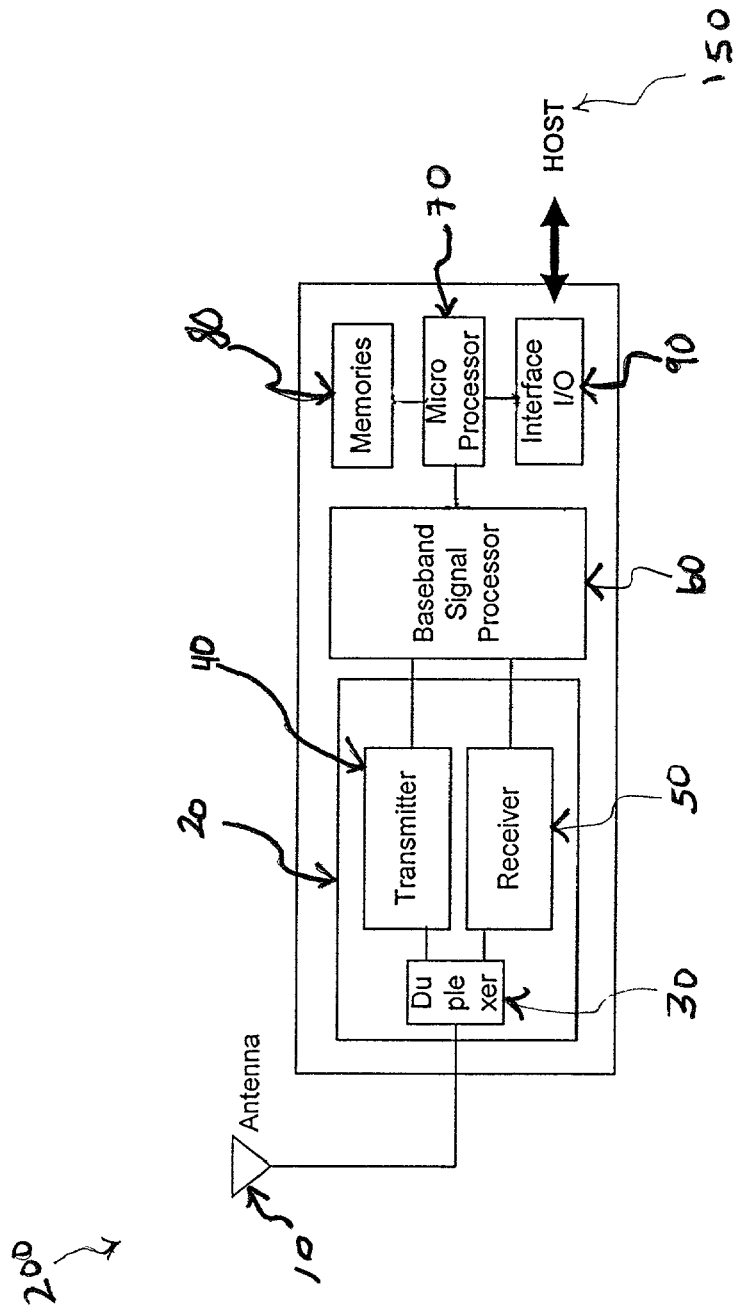
FIG. 1 is a block diagram of one embodiment of a wireless module.

Turning now to FIG. 1, one embodiment of a wireless module 200 is shown. Wireless module 200 includes an antenna 10 connected to a transceiver circuit 20. Transceiver circuit 20 includes a duplexer 30, a transmitter 40, and a receiver 50. Transmitter 40 and receiver 50 of transceiver circuit 20 are connected to a baseband signal processor circuit 60. Baseband signal processor circuit 60 is connected to a microprocessor 70. Memories 80 and an interface input/output (I/O) 90 are also connected to microprocessor 70. A host or peripheral unit/device 150 is connected to wireless module 200 through interface I/O 90.

In operation, wireless module 200 receives a signal(s) containing data packets through antenna 10 and forwards the received signals and data packets to duplexer 30, through receiver 50, and to baseband signal processor circuit 60. The data packets/received signals will then be forwarded to microprocessor 70 and through interface I/O 90 to peripheral device/host 150. For example, host/peripheral device 150 may be a PC, laptop, PDA, wireless telephone, or any other type of device or unit which can handle the data packets/received signals. Wireless module 200 receives and transmits data packets/received signals utilizing at least one wireless format selected from the group consisting of CDMA ONE, CDMA 2000 1X, CDMA 2000 3X, CDMA 1X EV, Wideband CDMA, GSM, GPRS and EDGE. In case peripheral device/host 150 engages in simultaneous transmission and reception of data packets, duplexer 30 and memories 80 are utilized.

Figure 2A:
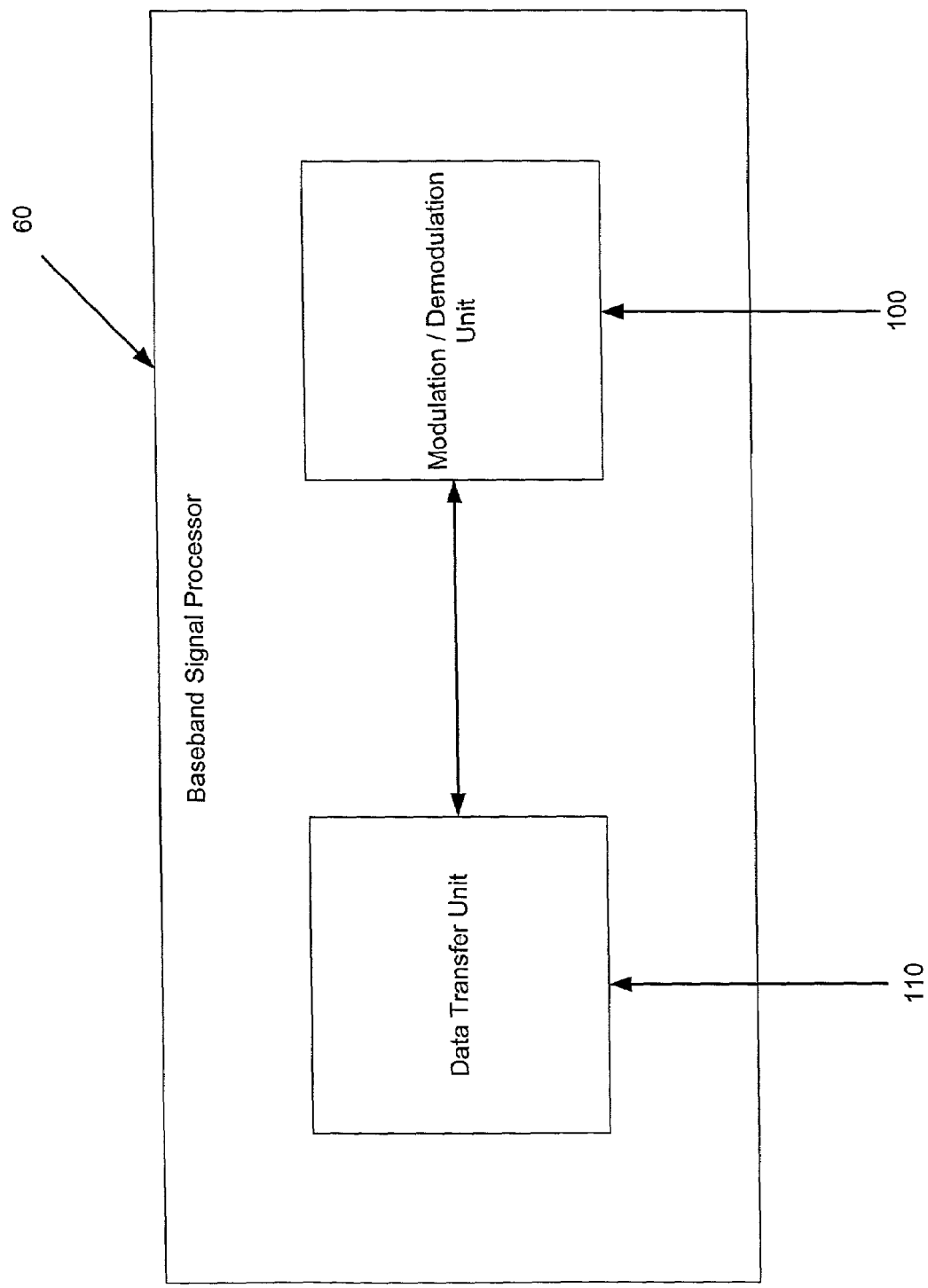
FIG. 2A is a block diagram of an embodiment of the baseband signal processor circuit shown in FIG. 1.

FIG. 2A shows one embodiment of baseband signal processor 60 (shown in FIG. 1) including a modulation/demodulation unit 100 connected to a data transfer unit 110. Modulation/demodulation unit 100 demodulates and converts the received signals to a baseband signal and supplies a demodulated baseband signal to data transfer unit 110 where data packets are extracted, e.g., an audio signal, a video signal, and control signals, from the received signals. Data transfer unit 110 supplies the extracted data packets to microprocessor 70 (shown in FIG. 1). In case peripheral device/host 150 engages in transmission of signals containing data packets, modulation/demodulation unit 100 modulates and converts the data packets into transmission signals which are sent to data transfer unit 110 and then to transmitter 40 and transceiver circuit 20 (shown in FIG. 1).

Figure 2B:
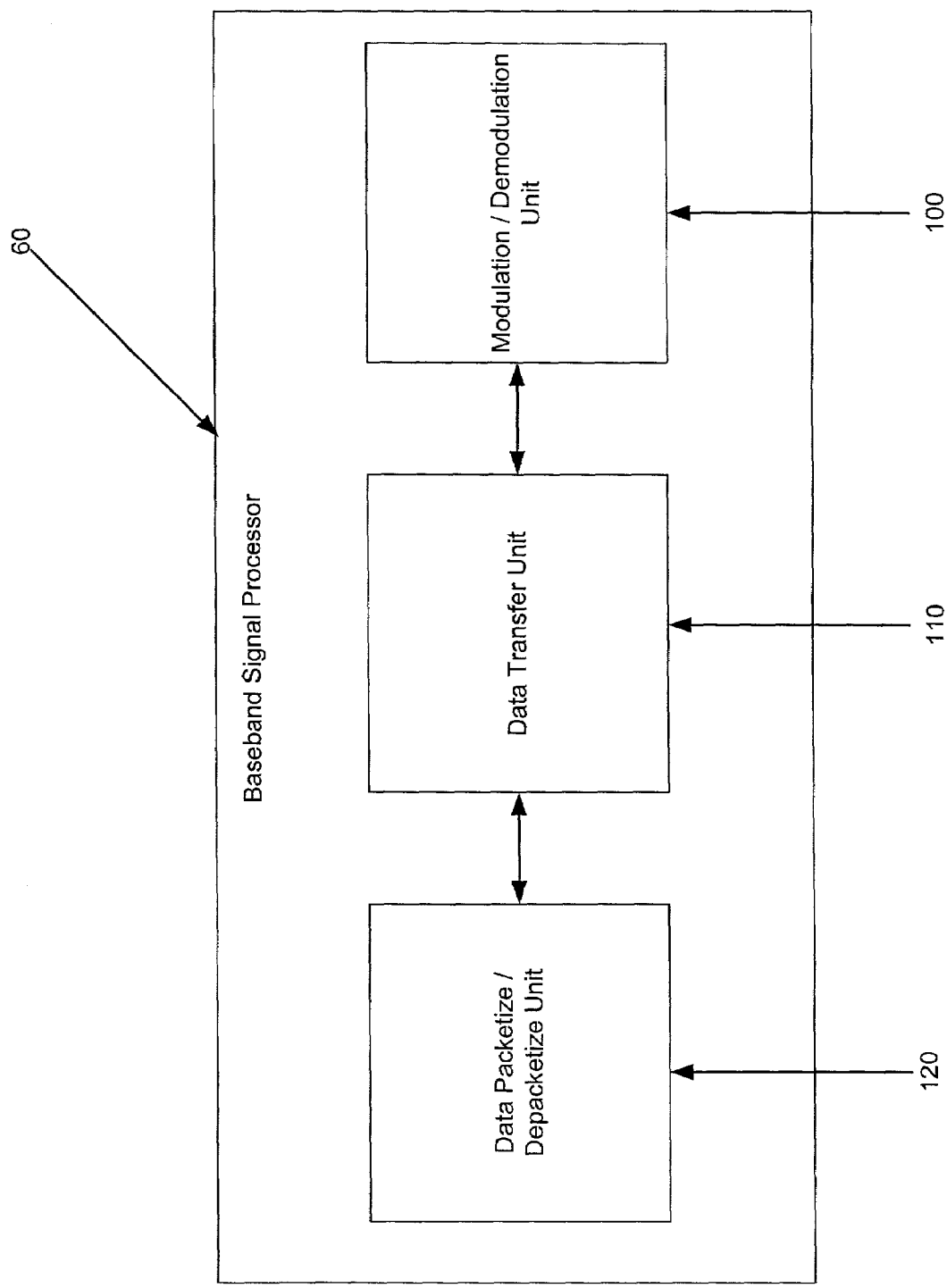
FIG. 2B is a block diagram of another embodiment of the baseband signal processor circuit shown in FIG. 1.

FIG. 2B shows another embodiment of baseband signal processor 60 (shown in FIG. 1) which includes an optional data packetize/depacketize unit 120 for packetizing/depacketizing transmission signals and received signals prior to sending transmission signals and received signals to transceiver circuit 20 and microprocessor 70 (shown in FIG. 1), respectively. Data packetize/depacketize unit 120 may be implemented by techniques well known to those skilled in the art.

Figure 2C:
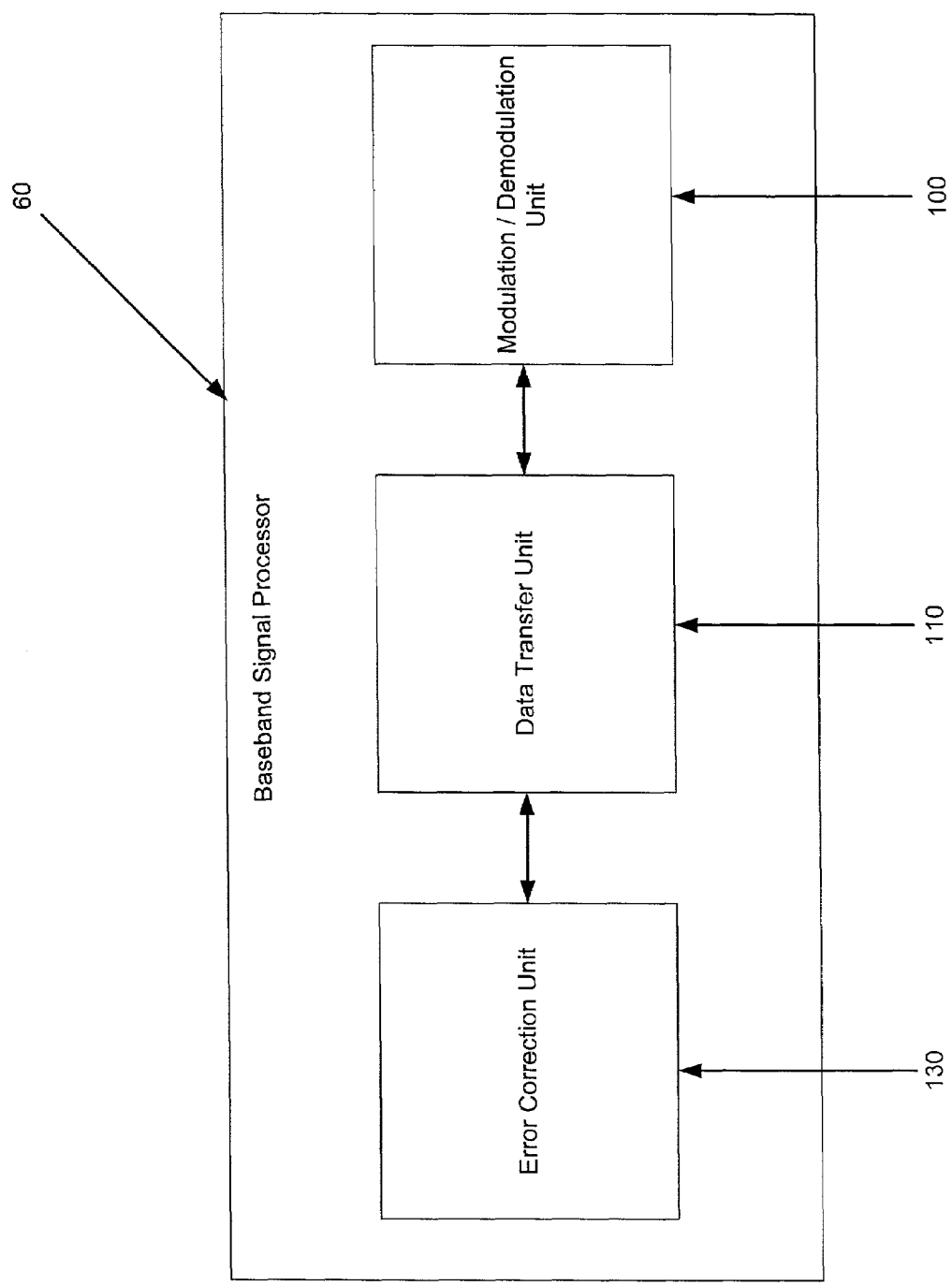
FIG. 2C is a block diagram of a further embodiment of the baseband signal processor circuit shown in FIG. 1.

In a further embodiment, referring to FIG. 2C, baseband signal processor 60 includes an error correction unit 130 for correcting data error prior to communication data to transceiver circuit 20 and microprocessor 70 (shown in FIG. 1). Error correction unit 130 may also be implemented by techniques well known to those skilled in the art. For example, wireless local area networks (LANs) typically experience higher error rates than wired LANs, which result in retransmission of data packets. In addition, the collision avoidance mechanism is not as efficient as collision detection used in Ethernet, especially with a large number of users. Therefore, packetization/depacketization and error correction results in a more efficient transmission in wireless environments.

FIGS. 2A through 2C show various embodiments of broadband signal processor 60 (shown in FIG. 1) for a wireless communication system. A wireless system eliminates many hardware requirements and adds mobility to a user. Generally, wireless communication may also be accomplished through the use of InfraRed (IR) or radio waves. The IEEE 802.11 and 802.11b specifications provide standards for both the InfraRed frequencies and the radio wave frequencies.

Figure 3:
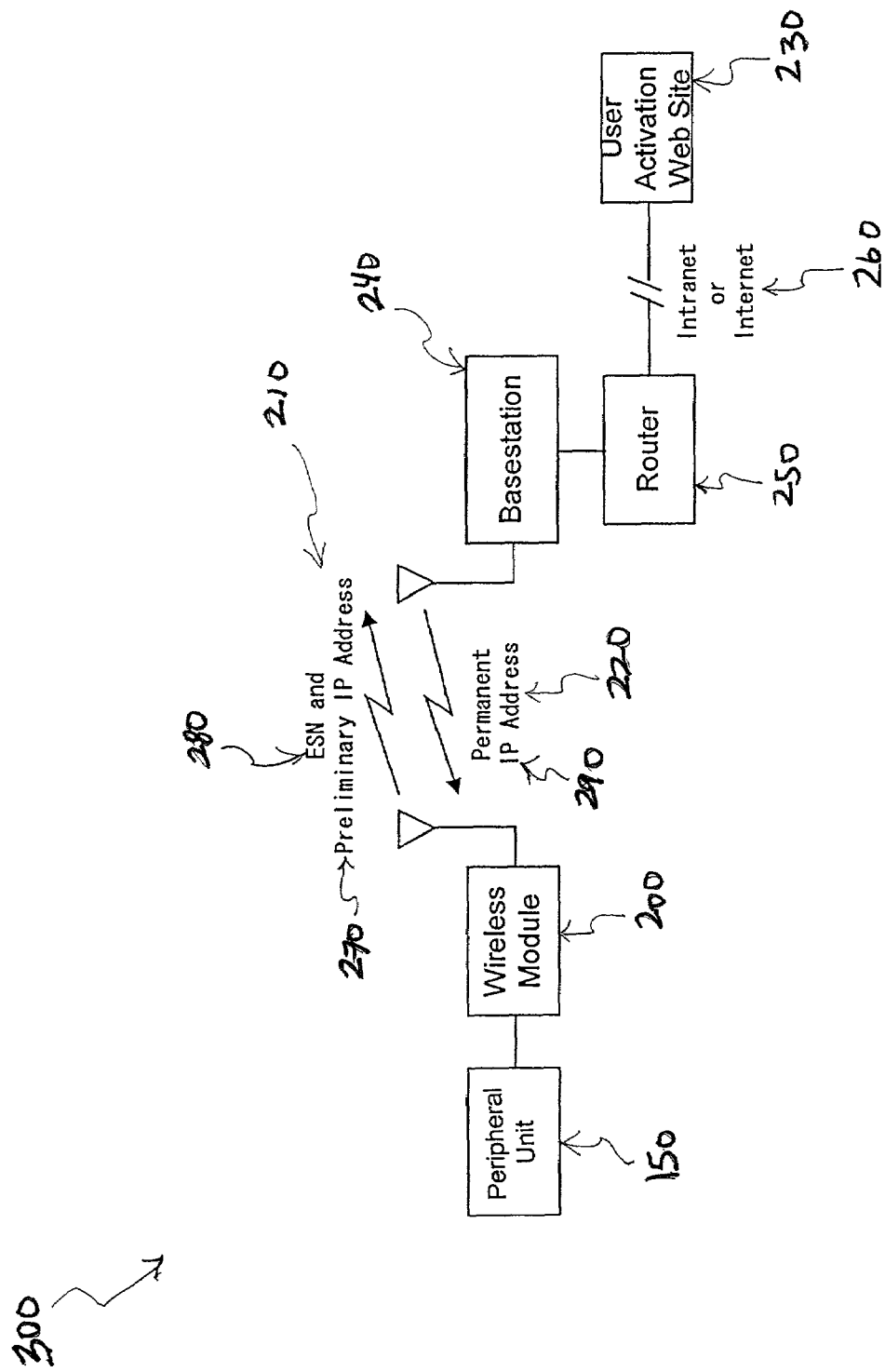
FIG. 3 is a block diagram of one embodiment of the wireless module in a system for activation.

FIG. 3 depicts one embodiment of a wireless module activation system 300 which includes wireless module 200 and peripheral device/host 150. Peripheral device/host 150 is electrically connected to wireless module 200 which is configured to transmit initialization data 210 and receive operational data 220. Wireless module activation system 300 includes a user activation web site 230 in electronic data communication with wireless module 200 and peripheral device/host 150. User activation web site 230 is configured to receive initialization data 210 and transmit operational data 220. In one embodiment, wireless module activation system 300 also includes a base-station 240 in electronic data communication with a router 250, wireless module 200, and user activation web site 230. Router 250 is in electronic data communication with user activation web site 230 through an intranet/internet 260. Wireless module 200 is configured to be removably connected to peripheral device/host 150.

In initial activation, wireless module 200 is provided with initialization data 210 which, in one embodiment includes a preliminary internet protocol address 270 and an electronic serial number (ESN) 280. Activation then progresses by establishing a wireless module account (not shown) with an activation center (not shown) through user activation web site 230 which engages in transmitting operational data 220 to wireless module 200 from the activation center. In one embodiment, operational data 220 includes a permanent internet protocol address 290. Initialization data 210 is transmitted by connecting wireless module 200 to peripheral device/host 150 and establishing an electronic data connection with the activation center also through user activation web site 230.

Establishing the wireless module account is accomplished by a user (not shown) supplying personal information to the activation center. The personal information may include the user's name, address, credit card information, etc., to the activation center which will store the user's personal information and complete electronic serial number 280 in the wireless module account. User activation web site 230 transmits permanent internet protocol address 290 which in one embodiment is stored in wireless module 200. Permanent internet protocol address 290 is provided to wireless module 200 once the wireless module account is established and is used until wireless module 200 is reset, deactivated, and can be stored to a non-volatile memory if wireless module 200 has such a device in it. In another embodiment, permanent internet protocol address 290 is stored in peripheral device/host 150. In a further embodiment, electronic serial number 280 is stored within peripheral device/host 150 which is removably connected to wireless module 200.

A wireless module activation server (not shown) includes user activation web site 230 for receiving initialization data 210 and transmitting operational data 220. Activation and deactivation of wireless module 200 is accomplished through user activation web site 230 which is in electronic data communication with all wireless module accounts. In one embodiment, the wireless activation server not only facilitates activation of wireless module 200 but also contains all of the wireless module accounts and all wireless module account data. In another embodiment, the wireless activation server is only in electronic data communication with the wireless module accounts.

Various other modifications and alterations in the structure and method of operation of this invention will be apparent to those skilled in the art, without departing from the scope and spirit of the invention. Although the invention has been described in connection with specified preferred embodiments, it should be understood that the invention as claimed should not be unduly limited to such specific embodiments. It is intended that the following claims describe the scope of the present invention and that the structures and methods within the scope of these claims and their equivalents be covered thereby.

What is claimed is:

1. A method for activation of a wireless module, said method comprising:
   providing the wireless module with initialization data including an electronic serial number (ESN) and a preliminary IP address;
   establishing a wireless module account with an activation center;
   transmitting the initialization data from the wireless module to the activation center;
   in response to receiving the initialization data from the wireless module, transmitting operational data to the wireless module from said activation center, the operational data being different from the initialization data and including a permanent IP address; and
   storing said operational data.

2. A method for activation of a wireless module as recited in claim 1, wherein transmitting said initialization data comprises:
   connecting the wireless module to a peripheral device; and
   establishing an electronic data connection between the wireless module and said activation center.

3. A method for activation of a wireless module as recited in claim 1, wherein establishing a wireless module account comprises:
   supplying a user's personal information to said activation center; and
   storing said user's personal information and said initialization data to said wireless module account.

4. A method for activation of a wireless module as recited in claim 1, wherein storing said operational data comprises storing a permanent internet protocol address.

5. A method for activation of a wireless module as recited in claim 4, wherein storing a permanent internet protocol address comprises storing said permanent internet protocol address in the wireless module.

6. A method for activation of a wireless module as recited in claim 4, wherein storing a permanent internet protocol address comprises storing said permanent internet protocol address in a peripheral unit.

7. A method for activation of a wireless module comprising:
   providing the wireless module with initialization data, wherein said initialization data comprises a preliminary internet protocol address and an electronic serial number, the wireless module configured to store said preliminary internet protocol address and said electronic serial number;
   establishing a wireless module account with an activation center;
   transmitting operational data including a permanent IP address to the wireless module from said activation center once said wireless module account is established; and
   providing said permanent internet protocol address for use by the wireless module until the wireless module is reset or deactivated.

8. A system for activation of a wireless module, said system comprising:
   a peripheral unit electrically connected to the wireless module, the wireless module configured to transmit initialization data and receive operational data; and
   a user activation web site in electronic data communication with the wireless module and said peripheral unit, said user activation web site configured to receive said initialization data and transmit said operational data, the initialization data including an electronic serial number and a preliminary address, the operational data including a permanent address different from the preliminary address, wherein said initialization data comprises a preliminary internet protocol address and an electronic serial number, the wireless module configured to store said preliminary internet protocol address and said electronic serial number.

9. A system for activation of a wireless module as recited in claim 8, further comprising a base station in electronic data communication with the wireless module and said user activation web site, said base station configured to receive and transmit said initialization data and said operational data.

10. A system for activation of a wireless module as recited in claim 8, wherein said operational data comprises a permanent internet protocol address, said peripheral unit configured to store said permanent internet protocol address.

11. A system for activation of a wireless module as recited in claim 8, wherein said operational data comprises a permanent internet protocol address, the wireless module configured to store said permanent internet protocol address.

* * * * *